United States Patent

[11] 3,615,784

[72] Inventor James R. Cattanach
 Province of British Columbia, Canada
[21] Appl. No. 847,438
[22] Filed Aug. 4, 1969
[45] Patented Oct. 26, 1971
[73] Assignees John Godfrey;
 Charles Hall; Alexander Bruce Robertson; Charles Reginald Tanner, all of Vancouver, Bc, Canada, part interest to each
 Continuation-in-part of application Ser. No. 583,959, Oct. 3, 1966, now abandoned.

[54] COMPOSITIONS FOR PRODUCING IMPROVED CONCRETE
 11 Claims, No Drawings
[52] U.S. Cl................................................ 106/88,
 252/307, 252/352, 252/356, 106/90
[51] Int. Cl............................................... C04b 7/02
[50] Field of Search....................................... 106/88,
 314, 90; 252/307, 352/356

[56] References Cited
 UNITED STATES PATENTS

| | | | |
|---|---|---|---|
| 1,769,275 | 7/1930 | Rice............... | 106/88 |
| 2,522,050 | 9/1950 | Lenderink........ | 99/114 |
| 2,613,155 | 10/1952 | White............. | 106/138 |
| 2,913,346 | 5/1958 | Hoffman.......... | 106/88 |
| 2,933,406 | 4/1960 | Salzberg et al... | 106/125 |
| 3,156,655 | 11/1964 | Bright............. | 252/109 |

FOREIGN PATENTS

| | | | |
|---|---|---|---|
| 633,114 | 12/1949 | Great Britain..... | 106/88 |
| 663,568 | 12/1951 | Great Britain..... | 106/88 |

*Primary Examiner*—Tobias E. Levow
*Assistant Examiner*—A. P. Demers
*Attorney*—Fetherstonhaugh and Co.

ABSTRACT: A composition for producing air-entrained concrete which includes hydrolyzed casein, water, and a polyethenoxy type surface active agent. Polyvinyl alcohol also can be added to mixture. These compositions in foamed or unfoamed form are mixed with hydraulic cement and water to produce air-entrained concrete or concrete with normal amounts of air.

COMPOSITIONS FOR PRODUCING IMPROVED CONCRETE

CROSS-REFERENCE TO RELATED APPLICATIONS

This application is a continuation-in-part of application Ser. No. 583,959, filed Oct. 3, 1966 now abandoned.

BACKGROUND OF THE INVENTION

This invention relates to compositions which are used in producing air-entrained concrete or concrete with usual amounts of air for any desired purpose.

Many air entraining compositions or agents have been used in the past in concrete. With most of the prior compositions, it was only possible to incorporate up to about 6 percent air in the concrete without greatly reducing the strength of the latter. Furthermore, with the prior compositions, it was necessary to add more than the usual amount of water to the concrete in order to obtain proper workability. It is well known that the use of a large percentage of water in concrete results in loss of strength and in shrinkage, and increases the setting time. In spite of this, however, it has been necessary to use large percentages of water in order to obtain the required workability.

Another disadvantage of the prior air entraining compositions which were added in foamed condition to concrete during the mixing thereof, was the loss of entrained air during the mixing operation, and the transportation and pouring of the concrete. The foamed compositions tended to break down particularly during mechanical mixing so that a large percentage of the air was lost, and the bubbles of the foamed composition tended to break into each other and form comparatively large air pockets, thus weakening the concrete. This breaking down continued during transportation and pouring of the concrete.

SUMMARY OF THE INVENTION

The main purpose of the present invention is the provision of air entraining or concrete improving compositions by means of which a large percentage of air can be mixed into the concrete without weakening it, and which increase the workability of the concrete while permitting the percentage of water therein to be decreased, thereby increasing the strength of the concrete.

Another object is the provision of a composition of the nature described which when foamed and mixed with concrete keeps the air of the foam trapped in the wet concrete despite any mechanical action and vibration to which the concrete is subjected, reduces or eliminates bleeding of the concrete which usually results in the loss of cement in a comparatively dry mix, and reduces or prevents spalling of the cured concrete under conditions of freezing and thawing.

The present air entraining composition is such that when it is foamed, very minute plastic bubbles are formed which contain air. These bubbles are very tenacious and do not break down under mechanical action and vibration. This composition is inert, and permits large amounts of air to be entrained in the concrete without loss of strength. The preferred composition according to this invention greatly increases the workability of the concrete while permitting a substantial reduction in the water content thereof. The preferred composition also speeds the evolution of heat from the tricalcium silicate of the concrete, thereby effecting a much earlier cure of the latter than heretofore possible.

A composition according to this invention comprises hydrolyzed casein mixed with a polyethenoxy type surface active agent. This composition can be used alone, but for many purposes it is improved by the addition of polyvinyl alcohol. The casein is preferably hydrolyzed by water and ammonium hydroxide or potassium hydroxide. Benzoic acid can be added to either of these compositions. When one of these compositions is added to the concrete as it is being mixed, the result is a concrete composition which produces greatly improved concrete.

DESCRIPTION OF THE PREFERRED EMBODIMENTS

A composition for use in producing air-entrained concrete in accordance with the present invention comprises hydrolyzed casein containing about 100 parts of casein mixed with from about 100 to 175 parts of a polyethenoxy-type surface active agent, these proportions being by weight. The casein is preferably hydrolyzed by ammonium hydroxide or potassium hydroxide. This composition is improved by the addition of about 0.25 to about 5 percent polyvinyl alcohol water solution. The polyvinyl alcohol solution may be prepared in any desired manner but it has been found that one of the best ways is to boil the polyvinyl alcohol in sufficient water to dissolve it, the alcohol being added to the boiling water until the polyvinyl alcohol will not absorb any more. It has been found that there can be about 10 pounds of polyvinyl alcohol to a gallon of water, but it is preferable to use about 6 pounds per gallon. The amounts of polyvinyl alcohol solution throughout this specification and the appended claims is the percentage of polyvinyl alcohol solids to the amount of cement for which the composition is designed or is used. The range is from about 0.25 to 5 percent polyvinyl alcohol solids to the amount of cement in the final concrete product or the amount of cement for which the composition is designed. The preferred amount for most purposes is about 3 percent.

It is advantageous to add some ortho-hydroxy benzoic acid the the composition. The amount of benzoic acid should be insufficient to create a reaction of its own, but it acts as a catalyst which speeds up the curing of the final concrete product.

A good composition in accordance with the present invention comprises a mixture of 100 parts of casein, 15 to 20 parts of ammonium hydroxide or potassium hydroxide, 1,000 to 2,500 parts of water, and 100 to 175 parts of polyethenoxy type surface active agent, these proportions being by weight. Although many polyethenoxy type agents can be used, the one that has been found most suitable is sold under the trade mark Lissapol NX. This is a surface active agent of the polyethenoxy type and belongs to the class of nonionic compounds characterized by the presence of a polyethylene glycol chain in the molecule. "Lissapol" is essentially an anhydrous form of an alkylated phenol ethylene oxide condensate. It is a surface active agent containing a polyethylene glycol chain and represented by the formula $R-O-C_2H_4(-OC_2H_4-)_nOH$. The advantages of this product are that it not only acts as a surface active agent, it acts as an air-entraining agent as well. It is nonionic, miscible with alkaline water and acid water, and is inert to Portland and alumina cement.

A preferred composition includes polyvinyl alcohol water solution. This is preferably a saturated solution, and the amount used depends upon the amount of cement in the final concrete product. If the polyvinyl alcohol solution is added during the mixing of the concrete, the amount added will depend upon the amount of cement in the mix, but if it is added to a composition used in the making of concrete, then the amount of polyvinyl alcohol will depend upon the amount of cement with which the composition is intended to be used. As stated above, the range of polyvinyl alcohol solids is 0.25 to 5 percent of the amount of cement, and it is preferable to use about 3 percent.

It is also preferable to add to this composition a very small amount of ortho-hydroxy benzoic acid. Referring to the composition immediately set out above, the benzoic acid is preferably about 0.0002 to about 0.0004 parts.

An extremely effective composition is 100 parts of casein, 20 parts of ammonium hydroxide or potassium hydroxide, 2,000 parts of water, 150 parts of the polyethenoxy surface active agent, and about 0.0003 parts of ortho-hydroxy benzoic acid. This preferred composition is improved by adding approximately 3 percent polyvinyl alcohol water solution.

When preparing the casein, only sufficient ammonium hydroxide or potassium hydroxide is used completely to hydrolyze the casein. Too much or too little results in free hydroxide or casein in the finished product. Free casein is a waste, whereas free hydroxide would have undesirable reaction with the cement. Hydrolyzed casein is inert in the concrete. Too little water makes it difficult to attain complete hydrolyses of the casein, and too much dilutes the composition. Too little of either the surface active agent or the benzoic acid accomplishes nothing, whereas too much of either tends to reduce the strength of the concrete.

The polyvinyl alcohol solution is prepared by boiling the polyvinyl alcohol in sufficient water to dissolve it. It is preferable to add the alcohol to boiling water until the alcohol will not absorb any more water. This may be up to 10 pounds per gallon of water, and it has been found that 6 pounds per gallon is the best combination.

In the preparation of the composition, the ammonium hydroxide or potassium hydroxide is added to the casein and the required water, and stirred vigorously. This solution is boiled for from 6 to 12 hours, depending upon the quantity. It is preferable to add sufficient water to compensate for the water lost during the boiling operation. After the solution has cooled, said polyethenoxy type surface active agent is added, as well as the ortho-hydroxy benzoic acid, if the latter is to be employed. If it is desired to use the polyvinyl alcohol solution, it can be added to this composition.

When the air entraining composition is to be used, it is diluted with water to about 3 to 8 percent, and a 4 percent solution is generally used. The diluted composition is prefoamed in one of the many known foaming devices to expand to approximately 40 times its original volume. This foam is added to the concrete as the latter is being mixed. The amount of composition (considered in the unfoamed condition) used in the concrete depends upon the percentage of air required in the finished product and the degree of foaming of the composition. Very good results are attained by using from one-half to 5 fluid ounces of the composition for each cubic yard of concrete. The maximum amount of composition results in concrete having about 17 percent air. This produces lightweight concrete, but if improved heavy weight concrete is required, the composition is not foamed before being added to the concrete mix.

The polyvinyl alcohol water solution, if required, can be in the air-entraining composition or if it is not, the alcohol solution can be added to the water being used to mix the concrete, and this is preferably done before the above composition, foamed or unfoamed, is added.

The hydrolyzed casein forms plastic, practically unbreakable bubbles that hold the air to be entrained in the concrete. The viscosity of the bubbles is such that they do not break down during the mixing and vibration of the concrete, and during the pouring of the latter. The surface active agent reduces the surface tension and viscosity of the water so that the quantity of the water can be reduced while a better mix is attained. The benzoic acid acts as a catalyst as there is not enough to create a reaction of its own, but it speeds the evolution of heat from the tricalcium silicate portion of the cement, thereby making the concrete cure faster.

The use of polyvinyl alcohol solution in the concrete mix improves the finished concrete by increasing its tensile, flexural, and crushing strengths, reinforcing the air bubbles so that air cannot escape when the concrete is battered about or subjected to pressure, and stopping shrinkage during curing of the concrete. It also increases the water resistance or waterproofing of the concrete, and increases its hardness relative to its density.

The mixture of hydrolyzed casein, ammonium or potassium hydroxide, water and surface active agent, with or without the benzoic acid, can be used alone to produce lightweight or heavy concrete, but the addition of the polyvinyl alcohol solution results in a stronger and more stable concrete, the stability resulting from the fact that there is considerably less loss of air during mixing and pouring.

The following an example of the production of heavy concrete (140 to 152 lbs. per cu. ft.):
 a. a desired heavy aggregate and correct amount of cement such as Portland or alumina cement.
 b. one-fourth oz. of 3 percent hydrolyzed casein mixture per sack of cement used. (One sack of cement includes 80 lbs. cement, net weight.)
 c. one-fourth oz. of 3 percent polyvinyl alcohol solution per sack of cement.
 d. this mixture and the solution can be mixed and added to the water for the cement mix, or they can be added separately.
 e. during mixing the additives foam and result in approximately 5 percent of air in the concrete.

The following is an example of a heavy lightweight concrete:
 a. sand and Portland or alumina cement.
 b. 12 fluid oz. of 4 percent hydrolyzed casein mixture per sack of cement.
 c. 12 fluid oz. of 4 percent polyvinyl alcohol solution per sack of cement.
 d. casein mixture and alcohol solution premixed or added separately.
 e. The mixture and solution can be prefoamed or they can be allowed to foam as the concrete is mixed.

An example of a lightweight concrete mix is:
 a. use cement alone, but sand can be included if weight of concrete is to be increased.
 b. 36 fluid oz. of 4 percent hydrolyzed casein mixture per sack of cement.
 c. 36 fluid oz. of 4 percent polyvinyl alcohol solution per sack of cement.
 d. prefoam mixture before adding it to concrete mix—alcohol solution should be added directly to the mix.

As the amount of hydrolyzed casein mixture or the polyvinyl alcohol solution is increased, the weight of the resulting concrete is reduced and its volume is increased. If heavy concrete is required, the type of aggregate should be altered in accordance with standard practice.

It has been found that with the present entraining composition, the amount of air in the concrete can be as much as 17 percent without reducing the concrete strength. The standard water-cement ratio is from 0.55 to 0.75, but when this composition is used, the water-cement ratio can be as low as from 0.25 to 0.50. This reduction of the water greatly increases the strength of the concrete.

A number of cylinders were made up at different times of concrete having the present composition therein for test purposes. The concrete of each batch was tested for slump and percentage of air therein, and the cylinders were tested after 29 days for compressive strength. The ratios of the mixes were approximately 1 cement, 5 sand and 7 small gravel. The following table sets out the results.

| Test | Compressive strength PSI | Amount of composition in mix-grams | Slump inches | Air percentage | Mixing time of composition and concrete in minutes |
|---|---|---|---|---|---|
| 1 | 4,500 | 9 | no slump | 7.0 | 3 |
| 2 | 4,500 | 9 | no slump | 7.0 | 3 |
| 3 | 5,220 | 9 | no slump | 7.0 | 3 |
| 4 | 5,580 | 11 | 3 | 10.0 | 3 |
| 5 | 5,730 | 11 | 3 | 10.0 | 3 |
| 6 | 5,495 | 11 | 3 | 10.0 | 3 |
| 7 | 5,870 | 6 | no slump | not tested | 3 |
| 8 | 5,995 | 6 | no slump | not tested | 3 |
| 9 | 4,730 | 12 | 1 | 17.0 | 4 |
| 10 | 5,410 | 12 | 1 | 17.0 | 4 |
| 11 | 5,020 | 12 | 1 | 17.0 | 4 |
| 12 | 4,360 | 10 | 1 | 10.0 | 4 |

Additional tests were made using a 4 percent aqueous solution of hydrolyzed casein and "Lissapol" surface active agent, plus a 1 percent water solution of polyvinyl alcohol as the air entraining agent. The casein and surfactant were prefoamed and added to Portland cement type 1 and fine sand during mixing thereof, while the polyvinyl alcohol was added to the water used in the mix.

Quantities of air-entraining agent:

104 lb. concrete—24 fluid ounces per sack of cement
94 lb. concrete—25.5 fluid ounces per sack of cement
89 lb. concrete—26.25 fluid ounces per sack of cement
81 lb. concrete—27.5 fluid ounces per sack of cement
63 lb. concrete 30 fluid ounces per sack of cement The original batch began as a 9 sack per cubic yard mix and as the weight decreased, the volume increased in the same ratio.

| Cylinder No. | Reported Wt./cu. ft. (lbs.) | Calculated Cement Content | Compressive strength in lbs./sq. inch. |
|---|---|---|---|
| 1 | 63 | 4.05 sks./cu. yd. | 260 |
| 2 | 63 | 4.05 sks./cu. yd. | 240 |
| 3 | 63 | 4.05 sks./cu. yd. | 226 |
| 4 | 81 | 5.2 sks./cu. yd. | 1370 |
| 5 | 81 | 5.2 sks./cu. yd. | 1334 |
| 6 | 81 | 5.2 sks./cu. yd. | 1404 |
| 7 | 89 | 5.7 sks./cu. yd. | 2524 |
| 8 | 89 | 5.7 sks./cu. yd. | 2236 |
| 9 | 89 | 5.7 sks./cu. yd. | 2164 |
| 10 | 94 | 6.0 sks./cu. yd. | 2236 |
| 11 | 94 | 6.0 sks./cu. yd. | 2524 |
| 12 | 94 | 6.0 sks./cu. yd. | 2668 |
| 13 | 104 | 6.7 sks./cu. yd. | 3676 |
| 14 | 104 | 6.7 sks./cu. yd. | 3496 |
| 15 | 104 | 6.7 sks./cu. yd. | 3712 |

Summing up, the advantages of the present composition are:

1. More air can be added to the concrete than heretofore possible without loss of strength because of the reduced percentage of water in the mix.
2. The viscous nature of the bubbles formed by the hydrolyzed casein keeps the air in the concrete during mixing and pouring.
3. Considerably less water is required in the concrete because of the polyethenoxy type surface active agent while retaining the required workability of the concrete, thereby increasing the strength of the latter.
4. The good workability of the concrete prevents bleeding which usually results in a loss of cement when comparatively dry mixes are used.
5. No spalling of the cured concrete takes place under conditions of freezing and thawing because the plastic bubbles of the entraining composition and the polyvinyl alcohol, when used, tend to seal the surface of the concrete, thereby keeping water out of it during use.
6. The bubbles of the composition are microscopic in size, owing to the viscous nature thereof, and do not break into each other to honeycomb the resulting cement.

I claim:

1. An aqueous composition for use in producing air-entrained concrete comprising a solution including base hydrolyzed casein and an alkylated phenol-ethylene oxide condensate nonionic surface active agent, said agent being present in an amount of from 100 to 175 parts by weight per 100 parts by weight of casein present in the base-hydrolyzed casein.
2. A composition as claimed in claim 1 in which the casein is hydrolyzed by water and ammonium hydroxide or potassium hydroxide.
3. A composition as claimed in claim 2 in which the casein is hydrolyzed by boiling with said hydroxide and water before being mixed with said surface active agent.
4. A composition as claimed in claim 2 in which the amount of said hydroxide is from about 15 to 25 parts, and the amount of water is from about 1,000 to 2,500 parts per 100 parts of casein.
5. A composition as claimed in claim 1 including about 0.0002 to about 0.0004 parts of ortho-hydroxy benzoic acid per 100 parts of casein.
6. A composition as claimed in claim 4 including about 0.0002 to about 0.0004 parts of ortho-hydroxy benzoic acid per 100 parts of casein.
7. An aqueous composition according to claim 1 wherein water is present in said solution in an amount of from 1,000 to 2,500 parts by weight per 100 parts by weight of casein.
8. An aqueous composition according to claim 1 wherein the casein content of said solution is from 3 to 8 percent, said composition further including hydraulic cement, said solution being present in an amount of from one-fourth to 36 fluid ounces per sack of cement, the water/cement ratio of said composition being from 0.25 to 0.50.
9. An aqueous composition according to claim 8 further including a material selected from the group consisting of sand and aggregate.
10. A composition according to claim 8 including about 0.0002 to 0.0004 parts of ortho-hydroxy benzoic acid per 100 parts of casein.
11. A composition according to claim 8 including about 0.25 to 5 percent by weight of polyvinyl alcohol based on the weight of said cement.